United States Patent
Ramirez (10) Patent No.: US 9,824,589 B1
(45) Date of Patent: Nov. 21, 2017

(54) VEHICLE COLLISION RISK DETECTION

(71) Applicant: Ford Global Technologies, LLC, Dearborn, MI (US)

(72) Inventor: Omar Antonio Ramirez, Portales Norte (MX)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/266,518

(22) Filed: Sep. 15, 2016

(51) Int. Cl.
G08G 1/16 (2006.01)
H04B 1/3822 (2015.01)
G08G 1/01 (2006.01)
G08G 1/137 (2006.01)

(52) U.S. Cl.
CPC .......... *G08G 1/166* (2013.01); *G08G 1/0112* (2013.01); *G08G 1/137* (2013.01); *H04B 1/3822* (2013.01); *G08G 1/0133* (2013.01)

(58) Field of Classification Search
CPC ...... G08G 1/166; G08G 1/0112; G08G 1/137; G08G 1/0133; H04B 1/3822
USPC ........................................ 340/903
See application file for complete search history.

(56) References Cited

U.S. PATENT DOCUMENTS

| | | | |
|---|---|---|---|
| 5,581,232 A * | 12/1996 | Tanaka | G01H 11/06 180/167 |
| 7,382,274 B1 | 6/2008 | Kermani et al. | |
| 8,618,952 B2 | 12/2013 | Mochizuki | |
| 9,214,086 B1 | 12/2015 | Onishi | |
| 9,472,097 B2 * | 10/2016 | Stelzig | G08G 1/0116 |
| 2008/0288162 A1 | 11/2008 | Theimer et al. | |
| 2012/0290146 A1* | 11/2012 | Dedes | G08G 1/163 701/1 |
| 2014/0035737 A1* | 2/2014 | Rashid | B60Q 9/008 340/435 |
| 2016/0054436 A1* | 2/2016 | Lee | G01S 13/04 345/211 |
| 2016/0167579 A1* | 6/2016 | Hwang | G08G 1/163 340/435 |
| 2016/0318445 A1* | 11/2016 | Sugimoto | B60Q 9/008 |
| 2016/0335897 A1* | 11/2016 | Naserian | G08G 1/161 |
| 2016/0368492 A1* | 12/2016 | Al-Stouhi | B60W 30/18154 |

FOREIGN PATENT DOCUMENTS

CN 103903479 A 7/2014

* cited by examiner

*Primary Examiner* — Zhen Y Wu
(74) *Attorney, Agent, or Firm* — Frank A. MacKenzie; Bejin Bieneman PLC (57) ABSTRACT

A vehicle system includes a communication interface programmed to receive, at a host vehicle, signals transmitted from a target vehicle. The vehicle system further includes a processor programmed to calculate a Doppler shift associated with the signals transmitted from the target vehicle and determine whether the target vehicle is moving toward the host vehicle based on the Doppler shift.

15 Claims, 5 Drawing Sheets

VEHICLE COLLISION RISK DETECTION

BACKGROUND

Vehicle-to-vehicle (V2V) communication protocols allow vehicles to wirelessly exchange information with one another. Examples of information that can be exchanged include a vehicle make and model, direction, speed, etc. Such communications are typically transmitted through radio frequency communication techniques.

DETAILED DESCRIPTION

Large objects between vehicles can block each driver's view as two vehicles approach an intersection. For instance, a building or large foliage near the intersection may prevent one or both drivers from seeing that another vehicle is approaching the intersection. While buildings or other large objects might interfere with some vehicle-to-vehicle communication signals, V2V communication may be used to alert the drivers of the respective vehicles of the other approaching vehicle. Thus, each driver may become aware of the other vehicle prior to reaching the intersection.

Being aware of the other vehicle is only a partial solution, however. It is also helpful for each driver to know if the other driver is observing right-of-way. For instance, the signs at the intersection might indicate which vehicle needs to cede right-of-way to the other. Simply being aware of the other vehicle may not be enough to know whether the other vehicle is observing right-of-way.

One option is to use characteristics of the signals transmitted from each vehicle to determine the speed and direction of the other approaching vehicle. One such characteristic is the Doppler shift, which can be used to determine if one vehicle (referred to as the "target vehicle") is moving toward or away from another vehicle (referred to as the "host vehicle"). Doppler shift can further be used to determine if the target vehicle is accelerating or decelerating.

An example vehicle collision detection system that can consider such characteristics includes a communication interface programmed to receive, at a host vehicle, signals transmitted from a target vehicle. The collision detection system further includes a processor programmed to calculate a Doppler shift associated with the signals transmitted from the target vehicle and determine whether the target vehicle is moving toward the host vehicle based on the Doppler shift. The collision detection system can further alert the driver of the host vehicle of the target vehicle if it appears that the target vehicle is not observing right-of-way.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 1:
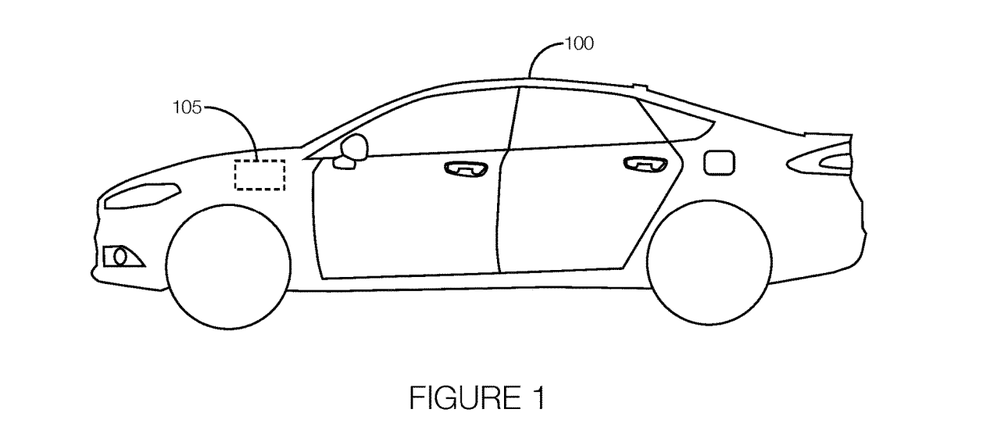
FIG. 1 illustrates an example host vehicle with a collision detection system for determining whether a target vehicle is moving toward or away from the host vehicle.

As illustrated in FIG. 1, the host vehicle 100 includes a collision detection system 105 that receives signals transmitted from a target vehicle, which may be a nearby vehicle traveling on a different roadway than the host vehicle 100. For example, the host vehicle 100 and the target vehicle may be on intersecting roadways. In some instances, the driver of the host vehicle 100 may not be able to see the target vehicle. For instance, in an urban area, the target vehicle may be hidden by a building. In rural areas, the target vehicle may be hidden by trees or shrubs. Even though the driver of the host vehicle 100 may not be able to see the target vehicle, the collision detection system 105 may receive signals transmitted from the target vehicle. The collision detection system 105 may further process those signals, by, e.g., calculating a Doppler shift of the signals transmitted from the target vehicle and determining whether the target vehicle is moving toward or away from the host vehicle 100 based on the Doppler shift.

The Doppler shift is caused by the Doppler effect. The Doppler effect is a phenomenon where the frequency of the signals transmitted by the target vehicle increases in the direction of travel of the target vehicle and decreases in the direction opposite the direction of travel of the target vehicle. The signals transmitted by the target vehicle may identify the transmission frequency (i.e., the frequency at which the signal was transmitted). To calculate the Doppler shift, the host vehicle 100 may determine the frequency at which the signals are received (referred to as the received frequency) and compare the transmission frequency to the received frequency. If the received frequency is greater than the transmission frequency, the collision detection system 105 determines that the target vehicle is moving toward the host vehicle 100. If the received frequency is less than the transmission frequency, the collision detection system 105 determines that the target vehicle is moving away from the host vehicle 100. If the transmission frequency and received frequency are equal, the host vehicle 100 determines that the target vehicle is stationary.

Moreover, by iteratively evaluating the Doppler shift, the collision detection system 105 can determine if the target vehicle is accelerating, decelerating, or maintaining a constant speed. For instance, the collision detection system 105 may determine that the target vehicle is accelerating if the received frequency increases over time. The collision detection system 105 may determine that the target vehicle is decelerating if the received frequency decreases over time. The collision detection system 105 may determine that the target vehicle is maintaining a constant speed if the received frequency does not change over time.

Although illustrated as a sedan, the host vehicle 100 may include any passenger or commercial automobile such as a car, a truck, a sport utility vehicle, a crossover vehicle, a van, a minivan, a taxi, a bus, etc. In some possible approaches, the host vehicle 100 is an autonomous vehicle that can operate in an autonomous (e.g., driverless) mode, a partially autonomous mode, and/or a non-autonomous mode.

Figure 2:
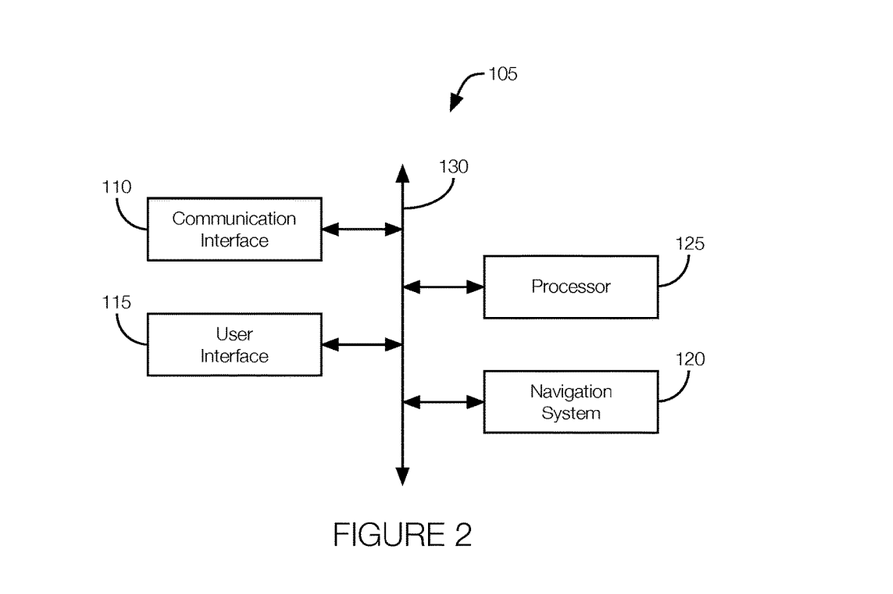
FIG. 2 is a block diagram illustrating example components of the collision detection system.

Referring now to FIG. 2, the collision detection system 105 includes or works in coordination with a communication interface 110, a user interface 115, a navigation system 120, and a processor 125 in communication with one another via, e.g., a communication bus 130.

The communication interface 110 is implemented via an antenna, circuits, chips, or other electronic components that can wirelessly receive signals transmitted from the target vehicle. The communication interface 110 may be programmed to communicate in accordance with any number of wireless communication protocols, including a vehicle-to-vehicle communication protocol, a vehicle-to-infrastructure communication protocol, Bluetooth®, Bluetooth Low Energy, Wifi, etc. An example of a vehicle-to-vehicle or vehicle-to-infrastructure communication protocol includes the Dedicated Short Range Communication (DSRC) protocol. In some possible approaches, the communication interface 110 receives signals from the target vehicle and transmits the signals to the processor 125. Moreover, the communication interface 110 may receive signals from infrastructure devices. The signals received from the infrastructure devices may indicate the state of a traffic control device. Example states of a traffic control device include whether the light is green, yellow, or red for the host vehicle 100, cross-traffic, or both.

The user interface 115 is implemented via circuits, chips, or other electronic components that can receive user inputs, present information to the driver of the host vehicle 100, present alerts to the driver of the host vehicle 100, or the like. The user interface 115 may include a display screen and real or virtual buttons. In some possible approaches, the user interface 115 includes a touch-sensitive display screen. In addition or in the alternative, the user interface 115 may include speakers, a microphone, or both. The speakers may be used to provide audible feedback to the driver. The display screen may be used to provide visual feedback to the driver. In some instances, the user interface 115 is able to provide haptic feedback via, e.g., a piezoelectric buzzer. The user interface 115 may provide audible, visual, or haptic feedback in response to signals received from, e.g., the processor 125, the communication interface 110, or both. For instance, the user interface 115 may provide feedback in accordance with a collision risk signal, discussed in greater detail below.

The navigation system 120 is implemented via circuits, chips, or other electronic components that can determine the location of the host vehicle 100 using, e.g., virtual map data stored locally or in a remote server. The map data may indicate the roadway of the host vehicle 100, the target vehicle, or both. The navigation system 120 may be programmed to determine the roadway of the host vehicle 100 by cross referencing signals received via a location system, such as a Global Positioning System (GPS), to the map data. The navigation system 120 may output a signal representing the location of the host vehicle 100 to the processor 125.

The processor 125 is implemented via circuits, chips, or other electronic components that can receive and process signals from target vehicles. The signals from the target vehicles may be received via the communication interface 110 and transmitted to the processor 125. The processor 125 may be programmed to calculate the Doppler shift of the signals transmitted from the target vehicles. By calculating the Doppler shift, and by considering other data transmitted with the signals, the processor 125 can determine whether the target vehicle is moving toward or away from the host vehicle 100. Specifically, the processor 125 may be programmed to determine the Doppler shift according to a difference between the transmission frequency and the received frequency. The difference may be represented as a ratio of the transmission frequency to the received frequency or the ratio of the received frequency to the transmission frequency.

The data incorporated into the signal transmitted by the target vehicle may indicate the transmission frequency of the signal. Thus, the processor 125 may determine the transmission frequency from the data transmitted by the target vehicle. The processor 125 may be able to determine the received frequency, which is the frequency at which the signal is received by the communication interface 110 at the host vehicle 100. The received frequency may be determined by the communication interface 110, the processor 125, or both. If done by the communication interface 110, the communication interface 110 may output a signal to the processor 125 indicating the received frequency.

With the Doppler shift, and specifically the ratio of the transmission frequency to the received frequency (or vice-versa), the processor 125 may determine whether the target vehicle is moving toward or away from the host vehicle 100. For instance, the processor 125 is programmed to determine that the target vehicle is moving toward the host vehicle 100 in response to the Doppler shift indicating that a frequency of the signals transmitted from the target vehicle increased and determine that the target vehicle is moving away from the host vehicle 100 in response to the Doppler shift indicating that a frequency of the signals transmitted from the target vehicle decreased. Thus, the processor 125 may determine the Doppler shift, and whether the target vehicle is moving toward or away from the host vehicle 100, based on a relationship between the received frequency and the transmission frequency.

Further, the processor 125 may determine the speed of the target vehicle according to the Doppler shift. One way for the processor 125 to determine the speed of the target vehicle is with reference to Equation (1).

$$f = \left(\frac{c + v_r}{c + v_s}\right)f_0 \qquad (1)$$

In Equation (1), f is the received frequency, $f_0$ is the transmission frequency, c is the velocity of waves in the medium, $v_r$ is the velocity of the receiver (e.g., the host vehicle 100), and $v_s$ is the velocity of the target vehicle. Thus, the processor 125 can calculate the speed of the target vehicle $v_s$ since the processor 125 knows or can determine the other variables in Equation (1) after it processes the signals from the target vehicle. For instance, the processor 125 can determine the host vehicle 100 speed $v_r$ from the vehicle computer, the received frequency $f_0$ from characteristics of the signals transmitted from the target vehicle (i.e., the communication interface 110 or processor 125 can determine the frequency of the signals received), f from the processing the signals transmitted from the target vehicle (i.e., the data incorporated into the signals may identify the transmission frequency), and c from a lookup table, database, cloud server, etc. In some instances, c is a constant. Further, the data transmitted by the target vehicle may include the speed of the target vehicle $v_s$, which the processor 125 may use to confirm its calculation of $v_s$.

Moreover, the processor 125 may be programmed to determine the direction of the target vehicle (e.g., either toward or away from the host vehicle 100) based at least in part on $v_r$ and $v_s$. Specifically, $v_r$ is a positive number when the host vehicle 100 is moving toward the target vehicle and a negative number when the host vehicle 100 is moving away from the target vehicle. Similarly, $v_s$ is a positive number when the target vehicle is moving away from the host vehicle 100 and a negative number when the target vehicle is moving toward the host vehicle 100. Therefore, the processor 125 may be programmed to determine the direction of the target vehicle if the transmission frequency $f_0$ is greater than or less than the received frequency f. A positive $v_r$ and a positive $v_s$ (i.e., the target vehicle moving toward the host vehicle 100) will make the received frequency f greater than the transmission frequency $f_0$. A negative $v_r$ and a negative $v_s$ (i.e., the target vehicle moving away from the host vehicle 100) will make the received frequency f less than the transmission frequency $f_0$.

Further, the processor 125 may be programmed to determine if the target vehicle is moving, the host vehicle 100 is moving, both are moving, or both are stationary. For instance, the processor 125 may be programmed to determine that the target vehicle is stationary relative to the host vehicle 100 the received frequency f is approximately equal to the transmission frequency $f_0$ and if at least one of the host vehicle 100 speed $v_r$ or the target vehicle speed $v_s$ are determined to be zero. The processor 125 may be programmed to determine that the target vehicle is moving relative to the host vehicle 100 while the host vehicle 100 is stationary if the received frequency f is different from the transmission frequency $f_0$ and if the host vehicle 100 speed $v_r$ is zero. The processor 125 may be programmed to determine that the target vehicle is stationary relative to the host vehicle 100 while the host vehicle 100 is moving if the received frequency f is different from the transmission frequency $f_0$ and if the host vehicle 100 speed $v_r$ is a non-zero number and the speed of the target vehicle $v_s$ is calculated to be zero.

The processor 125 may be further programmed to determine whether the target vehicle is accelerating or decelerating in accordance with the Doppler shift. That is, the processor 125 may be programmed to iteratively calculate the speed of the target vehicle and determine whether the target vehicle is accelerating or decelerating. If the processor 125 determines that the speed of the target vehicle $v_s$ is increasing over time, the processor 125 may determine that the target vehicle is accelerating. If the processor 125 determines that the speed of the target vehicle $v_s$ is decreasing over time, the processor 125 may determine that the target vehicle is decelerating. If the processor 125 determines that the speed of the target vehicle v remains constant over time, the processor 125 may determine that the target vehicle is traveling at a constant speed.

In some instances, prior to determining whether the target vehicle is moving toward or away from the host vehicle 100, the processor 125 may be programmed to determine whether the host vehicle 100 and the target vehicle are on the same or different roadways. For instance, the processor 125 may determine the roadway of the host vehicle 100 from the signal output by the navigation system 120. The processor 125 may determine the roadway of the target vehicle from the signals received from the target vehicle. The processor 125 may compare the roadways to determine if the host vehicle 100 and the target vehicle are on the same roadway. If so, the processor 125 may not determine whether the target vehicle is moving toward or away from the host vehicle 100 since, presumably, the driver will be able to see the target vehicle. That is, the view of the target vehicle from the host vehicle 100 is less likely to be obstructed by buildings, trees, shrubs, or other objects when the target vehicle and host vehicle 100 are on the same roadway. In an autonomous mode context, when the host vehicle 100 and the target vehicle are on the same roadway, the processor 125 may rely on the outputs of other vehicle sensors (e.g., a camera, LIDAR, RADAR, etc.) to determine whether the target vehicle is moving toward or away from the host vehicle 100.

The processor 125 may further consider the elevations of the roadways prior to determining whether the host vehicle 100 and target vehicle are moving toward or away from one another since not all roads that cross one another intersect. For instance, the target vehicle may be on a bridge going over the roadway of the host vehicle 100. In that instance, the processor 125 need not determine the collision risk since the host vehicle 100 and target vehicle would not intersect, even if the driver of the host vehicle 100 is unaware of the target vehicle. The processor 125 may determine elevation of the roadways, and thus, whether the roadways intersect, from the virtual map data received from the navigation system 120.

The processor 125 may be programmed to determine a collision risk associated with the speed and direction of the target vehicle. The collision risk may be based on the Doppler shift, and specifically, on the ratio of the transmission frequency to the received frequency or the ratio of the received frequency to the transmission frequency. The processor 125 may determine the collision risk by comparing the ratio to a predetermined threshold. The predetermined threshold may be set in accordance with a ratio that would apply to a target vehicle heading toward an intersection and is unable or unlikely to stop at the intersection. If the ratio is of the received frequency to the transmission frequency, the processor 125 may determine the collision risk according to whether the ratio exceeds the predetermined threshold. If the ratio is of the transmission frequency to the received frequency, the processor 125 may determine the collision risk according to whether the ratio is below the predetermined threshold. Alternatively, in either instance, the inverse of the ratio may be compared to the predetermined threshold so that a single predetermined threshold may be used regardless of whether the ratio is of the transmission frequency to the received frequency or of the received frequency to the transmission frequency.

The processor 125 may be programmed to output a collision risk signal if the ratio (or the inverse of the ratio as the case may be) exceeds the predetermined threshold. The collision risk signal may be output to the user interface 115 so that an alert may be presented to the driver of the host vehicle 100. The alert may include, e.g., an audible alert, a visual alert, a haptic alert, or the like.

In some instances, the processor 125 may further be programmed to consider the state of a traffic control device before outputting the collision risk signal. That is, if the traffic control device indicates that the target vehicle has right-of-way to proceed through the intersection, the processor 125 may not output the collision risk signal, especially if the host vehicle 100 is stopped at the intersection. Additionally, the processor 125 may output the collision risk signal if the traffic control device state indicates that the host vehicle 100 has right-of-way and the Doppler shift shows that the target vehicle is not slowing down.

Figure 3A:
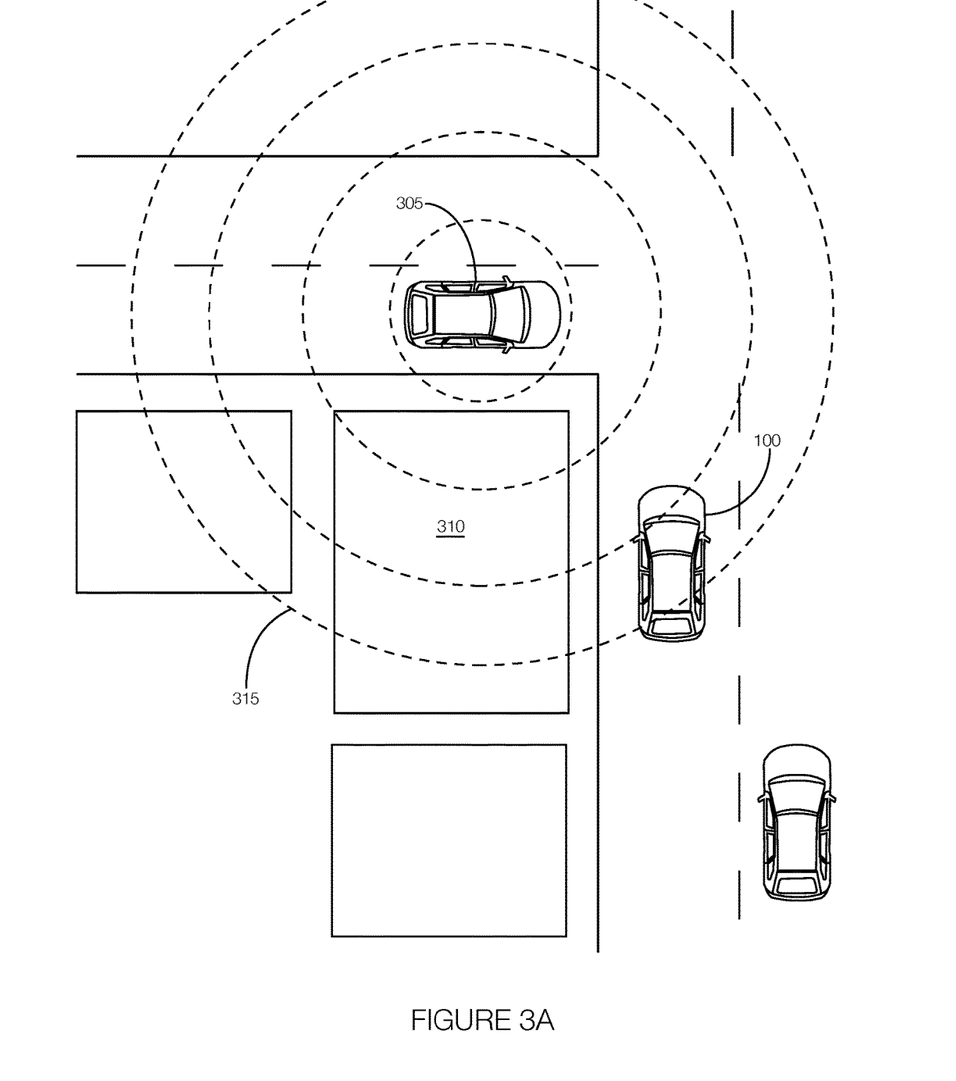
FIGS. 3A-3C illustrate various scenarios where a target vehicle is stationary, moving toward, or moving away from a host vehicle.
Figure 3B:
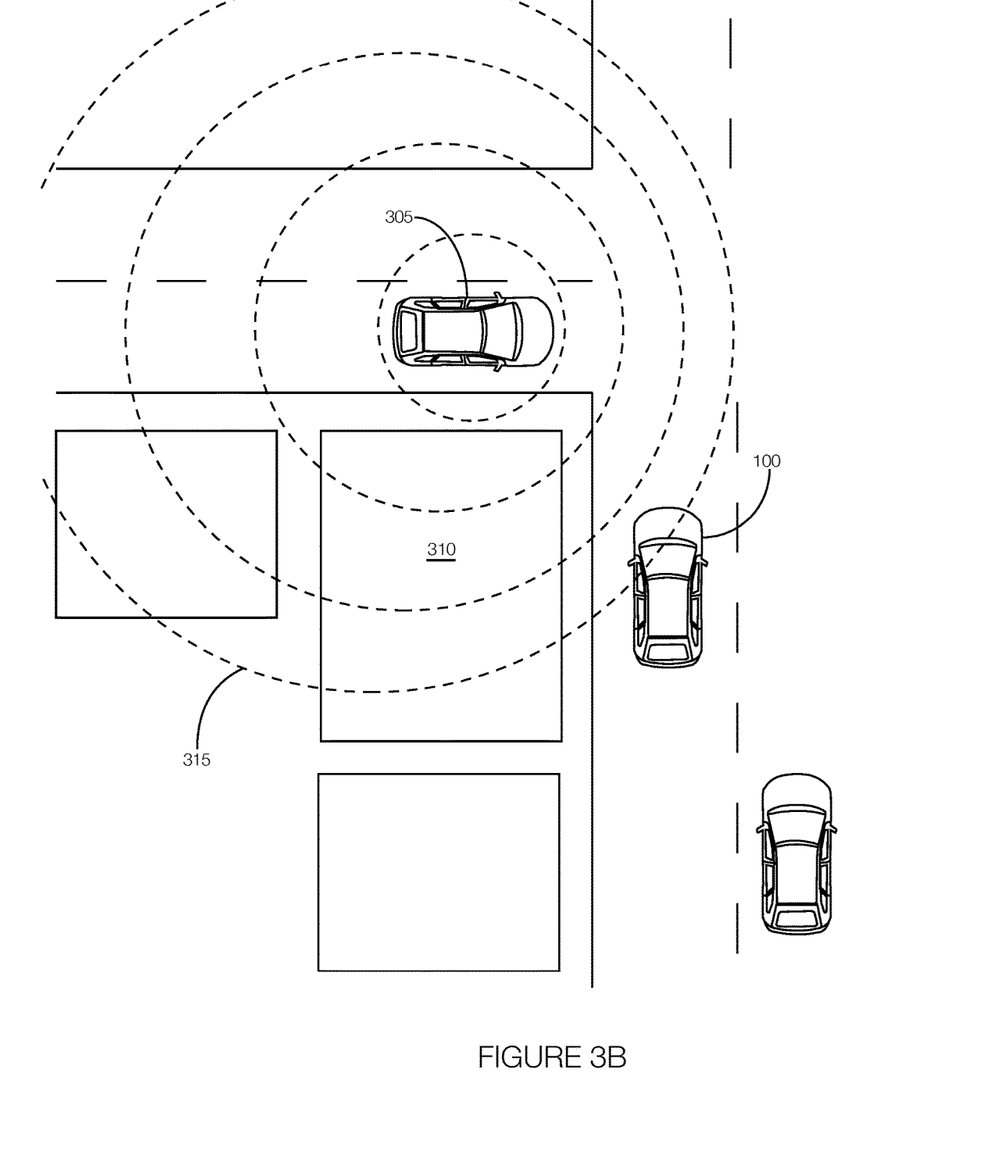
Figure 3C:
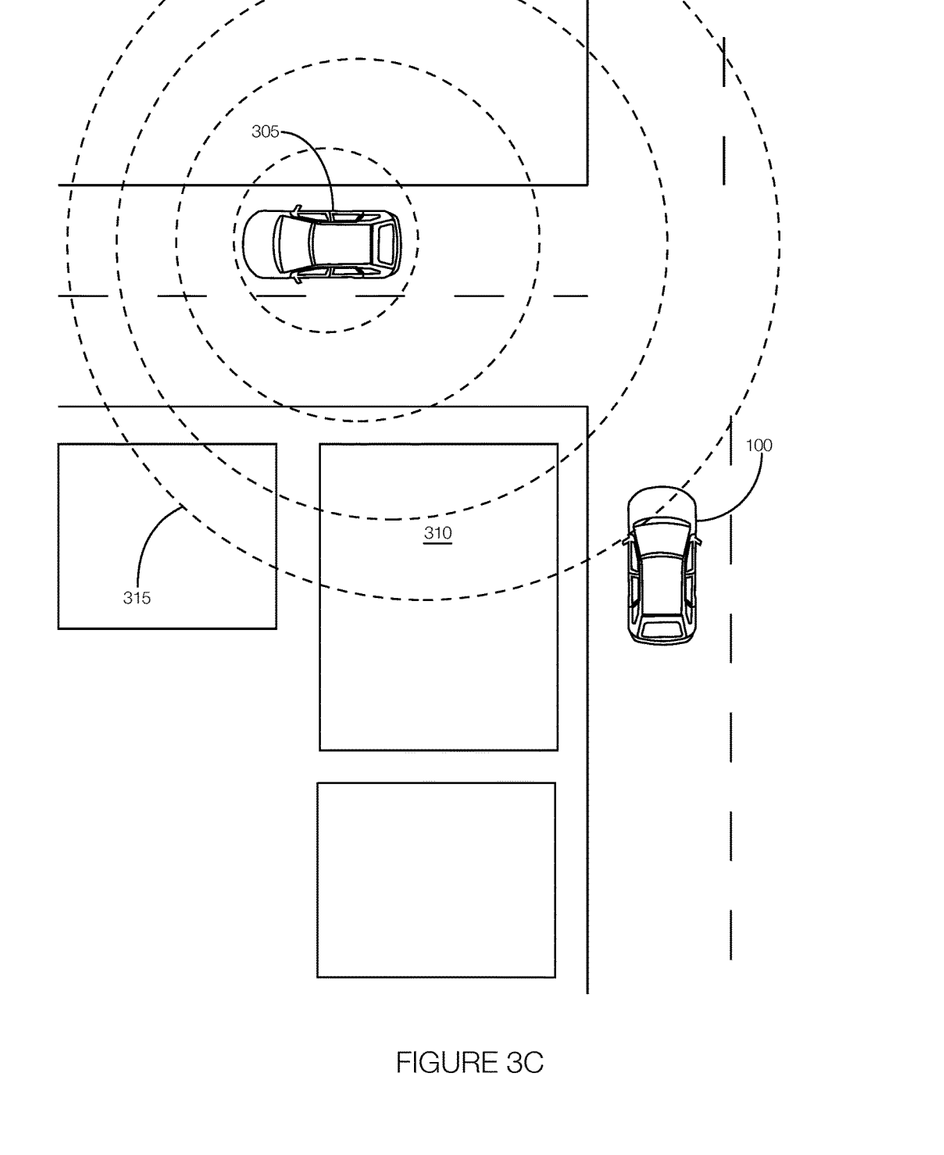

FIGS. 3A-3C illustrate various scenarios where a target vehicle is stationary, moving toward, or moving away from a host vehicle 100, respectively. Each of these scenarios assumes that the host vehicle 100 has already determined that the host vehicle 100 and target vehicle are on intersecting roadways.

Referring to FIG. 3A, the target vehicle 305 is stationary, although a driver of the host vehicle 100 may not know that since a building 310 may partially block the view of the driver of the host vehicle 100. The signals 315 (not necessarily to scale) transmitted from the target vehicle 305 have a uniform frequency, meaning that the signals 315 radiate concentrically from the target vehicle 305, and the received frequency would be the same as the transmission frequency regardless of whether the host vehicle 100 is ahead of (as shown) or behind the target vehicle 305. The host vehicle 100 may receive the signals 315, determine the received frequency and the transmission frequency as described above, determine the ratio (which is one since the received frequency and transmission frequency are the same), and compare the ratio to the predetermined threshold. Since a ratio of one indicates a stopped target vehicle, that ratio is not likely to exceed the predetermined threshold. The host vehicle 100, therefore, may refrain from alerting the driver about the target vehicle.

Referring now to FIG. 3B, the target vehicle 305 is moving toward the intersection, and thus, is on a collision path with the host vehicle 100, and the driver of the host vehicle 100 may not see the target vehicle 305 if the building 310 blocks the driver's view. The propagation of the signal 315 (not to scale) is affected by the Doppler effect since the target vehicle 305 is moving toward the intersection. In this instance, the received frequency is higher than the transmission frequency from an area ahead of the target vehicle 305, including the area near the host vehicle 100. In this scenario, the host vehicle 100 may receive the signals 315, determine the received frequency and the transmission frequency as described above, determine the ratio of the received frequency to the transmission frequency (which would be greater than one in this example), and compare the ratio to the predetermined threshold. Since a ratio of the received frequency to the target frequency greater than one indicates that the target vehicle is moving toward the host vehicle 100, and since the ratio will increase with the speed of the target vehicle, the predetermined threshold may be one or a value slightly greater than one. Examples of such predetermined thresholds may include 1.05, 1.10, 1.15, 1.20, etc. Alternatively, if the ratio is of the transmission frequency relative to the received frequency, the host vehicle 100 may consider whether the inverse of the ratio exceeds the predetermined threshold or whether the ratio is below a different predetermined threshold (e.g., 0.95, 0.90, 0.85, etc.). If the ratio (or inverse of the ratio as the case may be) exceeds the predetermined threshold or otherwise indicates a risk of a collision, the host vehicle 100 may warn the driver via the user interface 115.

Referring to FIG. 3C, the target vehicle 305 is moving away from the intersection, and thus, is not on a collision path with the host vehicle 100. The propagation of the signal 315 (not to scale) is affected by the Doppler effect since the target vehicle 305 is moving away from the intersection. In this instance, the received frequency is lower than the transmission frequency from an area behind of the target vehicle 305, including the area near the host vehicle 100. In this scenario, the host vehicle 100 may receive the signals 315, determine the received frequency and the transmission frequency as described above, determine the ratio of the received frequency to the transmission frequency (which would be less than one in this example), and compare the ratio to the predetermined threshold. Since a ratio of the received frequency to the target frequency less than one indicates that the target vehicle is moving toward the host vehicle 100, that host vehicle 100 may determine that there is no collision risk, and thus, may not present the collision risk alert to the driver. The same may apply if the ratio of the transmission frequency relative to the received frequency is less than one.

Figure 4:
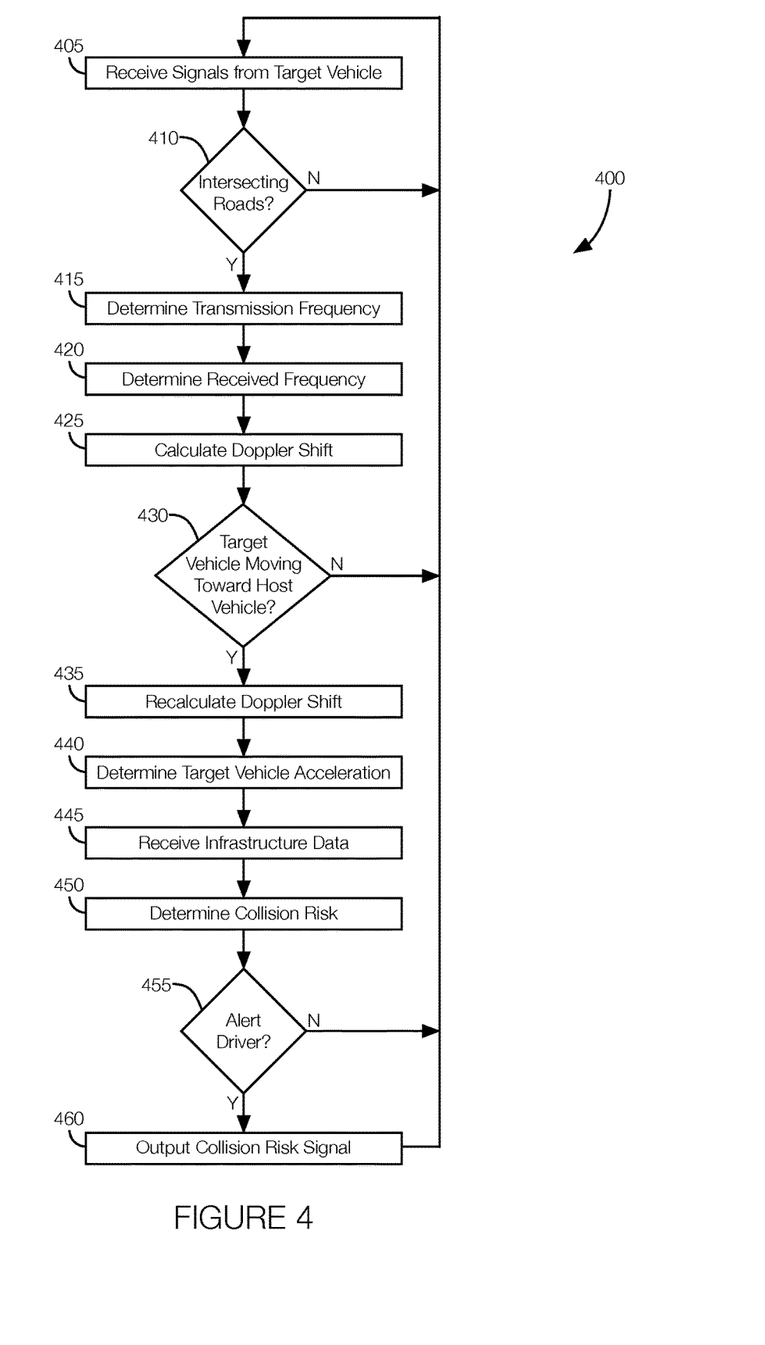
FIG. 4 is a flowchart of an example process that may be executed by the collision detection system to determine whether the target vehicle is moving toward or away from the host vehicle.

FIG. 4 is a flowchart of an example process 400 that may be implemented by one or more components of the collision detection system 105. The process 400 may run while the host vehicle 100 is operating and may continue to run until, e.g., the host vehicle 100 is turned off.

At block 405, the collision detection system 105 receives signals from one or more target vehicles. The signals may be broadcast by the target vehicle in accordance with a wireless communication protocol such as the Dedicated Short Range Communication (DSRC) protocol. The communication interface 110 may receive the signals and transmit data from the signals to the navigation system 120, the processor 125, or both.

At decision block 410, the collision detection system 105 determines if the host vehicle 100 and the target vehicle are on intersecting roads. The navigation system 120 or the processor 125 may make such a determination according to the virtual map data. Further, the navigation system 120 or processor 125 may consider whether the elevations of the roads to determine if, e.g., the target vehicle or host vehicle 100 is on a bridge going over the road of the other vehicle. If the host vehicle 100 and target vehicle are not on intersecting roadways, the process 400 may return to block 405. If the host vehicle 100 and the target vehicle are on intersecting roadways, the process 400 may proceed to block 415.

At block 415, the collision detection system 105 determines the transmission frequency of the signals transmitted from the target vehicle. The transmission frequency may be determined from, e.g., the data received with the signal. The communication interface 110 or the processor 125 may extract the data from the signal and determine the transmission frequency from the extracted data. Thus, the target vehicle may "tell" the host vehicle 100 the transmission frequency.

At block 420, the collision detection system 105 determines the received frequency of the signals transmitted from the target vehicle. The received frequency may be measured or calculated by the collision detection system 105. For instance, the received frequency may be measured or calculated by the communication interface 110 or the processor 125.

At block 425, the collision detection system 105 calculates the Doppler shift. The Doppler shift may be a function of the transmission frequency determined at block 415 and the received frequency determined at block 420. In some instances, the Doppler shift is a ratio of the received frequency to the transmission frequency or a ratio of the transmission frequency to the received frequency. The collision detection system 105 may further determine the speed of the host vehicle 100, the speed of the target vehicle, or both. For example, the speed of the host vehicle 100 can be determined from other vehicle systems and the speed of the target vehicle can be calculated from Equation (1).

At decision block 430, the collision detection system 105 determines if the target vehicle is moving toward the host vehicle 100. The processor 125 may determine that the target vehicle is moving toward the host vehicle 100, is moving away from the host vehicle 100, or is stationary relative to the host vehicle 100 based on the Doppler shift associated with the signals transmitted from the target vehicle. For instance, the processor 125 may compare the ratio of the received frequency to the transmission frequency or the ratio of the transmission frequency to the ratio of the received frequency to a predetermined threshold, which may be around one since a ratio of one (in either instance) would indicate that the target vehicle is stationary. If the processor 125 determines that the target vehicle is moving toward the host vehicle 100, the process 400 may proceed to block 435. If the processor 125 determines that the target vehicle is stationary or is moving away from the host vehicle 100, the process 400 may return to block 405.

At block 435, the collision detection system 105 recalculates the Doppler shift. The processor 125 may recalculate the Doppler shift by considering the transmission frequency and received frequency, as discussed above with respect to block 425.

At block 440, the collision detection system 105 determines the acceleration or deceleration of the target vehicle. The processor 125 may determine the acceleration or deceleration to determine, e.g., if the target vehicle is speeding up or slowing down. That is, the processor 125 may use Equation (1) again to determine if the speed of the target vehicle has changed.

At block 445, the collision detection system 105 receives infrastructure data. The infrastructure data may be transmitted by an infrastructure device (e.g., an electronic device with an antenna programmed to wirelessly communicate according to a vehicle-to-infrastructure communication protocol such as DSRC) and received at the host vehicle 100 via the communication interface 110. The infrastructure data may indicate the state of a traffic control device located at the intersection near the host vehicle 100 and the target vehicle. The processor 125 may determine whether the target vehicle or the host vehicle 100 has right-of-way to proceed through the intersection according to the infrastructure data.

At block 450, the collision detection system 105 determines the collision risk. The processor 125, for instance, may determine the collision risk according to whether the target vehicle is accelerating or decelerating as it approaches the intersection, whether the target vehicle or the host vehicle 100 has right-of-way according to the infrastructure data, the ratio determined at block 425 and recalculated at block 435, etc.

At decision block 455, the collision detection system 105 determines whether to alert the driver of the host vehicle 100. For instance, if the processor 125 determines that the host vehicle 100 has right-of-way but the target vehicle is not decelerating, the processor 125 may determine that the collision risk is high and that the driver of the host vehicle 100 should be warned. If the processor 125 determines that the host vehicle 100 has right-of-way and that the target vehicle is decelerating, the processor 125 may determine that the collision risk is low and that the driver of the host vehicle 100 does not need to be warned. If the processor 125 determines that the driver of the host vehicle 100 should be warned of the target vehicle, the process 400 proceeds to block 460. If the processor 125 determines that the driver of the host vehicle 100 does not need to be warned, the process 400 may return to block 405.

At block 460, the collision detection system 105 outputs the collision risk signal. The processor 125 may, for example, output the collision risk signal to the user interface 115. The collision risk signal may instruct the user interface 115 to present an alert to the driver indicating the presence of the target vehicle, the collision risk associated with the target vehicle, etc. The alert may be an audible alert, a visual alert, or a haptic alert, as discussed above. The process 400 may return to block 405 after block 460.

The process 400 described above uses the Doppler shift to determine if the target vehicle poses a collision risk to a host vehicle 100 and whether to warn the driver of the host vehicle 100 of the target vehicle.

In general, the computing systems and/or processing devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
   a communication interface programmed to receive, at a host vehicle, signals transmitted from a target vehicle; and
   a processor programmed to calculate a Doppler shift associated with the signals transmitted from the target vehicle and determine whether the target vehicle is moving toward the host vehicle based on the Doppler shift,
   wherein the processor is programmed to determine that the target vehicle and host vehicle are on intersecting roads in response to receiving the signals from the target vehicle and calculate the Doppler shift of the signals as a result of determining that the host vehicle and the target vehicle are on intersecting roads,
   wherein the processor is programmed to determine whether the host vehicle and the target vehicle are on intersecting roads based at least in part on data transmitted with the signals from the target vehicle and virtual map data.

2. The vehicle system of claim 1, wherein the processor is programmed to determine that the target vehicle is moving toward the host vehicle in response to the Doppler shift indicating that a frequency of the signals transmitted from the target vehicle increased and determine that the target vehicle is moving away from the host vehicle in response to the Doppler shift indicating that a frequency of the signals transmitted from the target vehicle decreased.

3. The vehicle system of claim 1, wherein the processor is programmed to determine whether the target vehicle is accelerating or decelerating based on the Doppler shift.

4. The vehicle system of claim 1, wherein the communication interface is programmed to receive the signals transmitted from the target vehicle in accordance with a vehicle-to-vehicle communication protocol.

5. The vehicle system of claim 1, wherein the processor is programmed to determine a speed of the target vehicle based at least in part on data transmitted with the signals transmitted from the target vehicle.

6. The vehicle system of claim 1, wherein the processor is programmed to determine a transmission frequency of the signals from the target vehicle from data transmitted with the signals and calculate the Doppler shift based at least in part on the transmission frequency.

7. The vehicle system of claim 6, wherein the processor is programmed to calculate the Doppler shift based on a difference between the transmission frequency and a received frequency of the signals from the target vehicle.

8. The vehicle system of claim 7, wherein the processor is programmed to calculate the Doppler shift according to a ratio based on the received frequency and the transmission frequency.

9. The vehicle system of claim 8, wherein the processor is programmed to compare the ratio to a predetermined threshold and output a collision risk signal indicating that the ratio exceeds the predetermined threshold.

10. A method comprising:
    receiving, at a host vehicle, signals transmitted from a target vehicle;
    calculating a Doppler shift associated with the signals transmitted from the target vehicle; and
    determining whether the target vehicle is moving toward the host vehicle based on the Doppler shift;
    determining that the target vehicle and host vehicle are on intersecting roads in response to receiving the signals from the target vehicle, wherein determining that the host vehicle and the target vehicle are on intersecting roads is based at least in part on data transmitted with the signals from the target vehicle and virtual map data; and calculating the Doppler shift of the signals upon determining that the host vehicle and the target vehicle are on intersecting roads.

11. The method of claim 10, further comprising:

determining that the target vehicle is moving toward the host vehicle in response to the Doppler shift indicating that a frequency of the signals transmitted from the target vehicle increased; and determining that the target vehicle is moving away from the host vehicle in response to the Doppler shift indicating that a frequency of the signals transmitted from the target vehicle decreased.

12. The method of claim 10, further comprising determining whether the target vehicle is accelerating or decelerating based on the Doppler shift.

13. The method of claim 10, further comprising determining a speed of the target vehicle based at least in part on data transmitted with the signals transmitted from the target vehicle.

14. The method of claim 10, wherein calculating the Doppler shift includes:

determining a transmission frequency of the signals from the target vehicle from data transmitted with the signal;

determining a received frequency of the signal; and calculating the Doppler shift according to a ratio based on the received frequency and the transmission frequency.

15. The method of claim 14, further comprising:

comparing the ratio to a predetermined threshold; and outputting a collision risk signal indicating that the ratio exceeds the predetermined threshold.

* * * * *